Feb. 2, 1954      A. H. HART      2,667,808
DRIVE FOR MOVING PICTURE CAMERAS
Filed Jan. 8, 1951
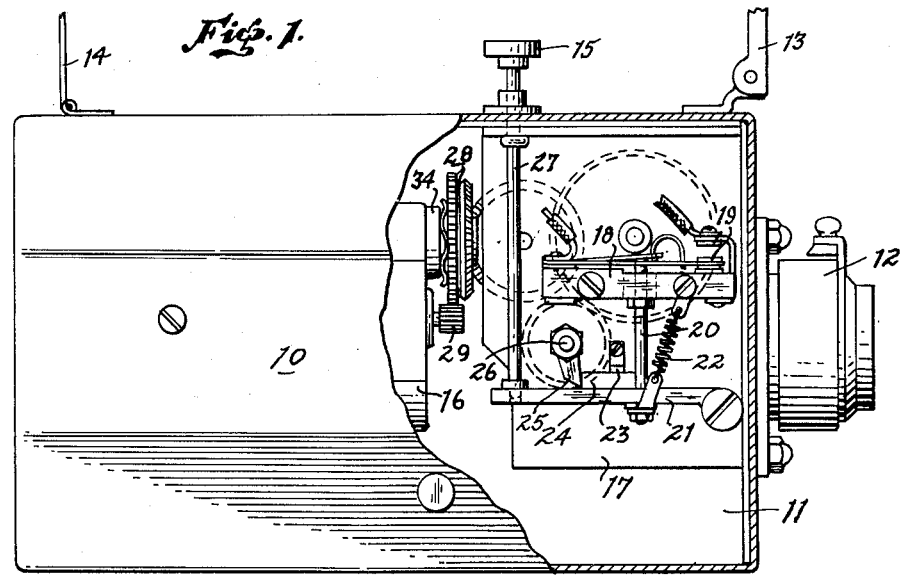
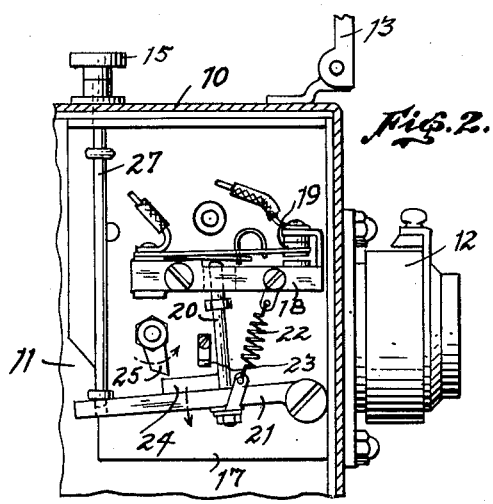
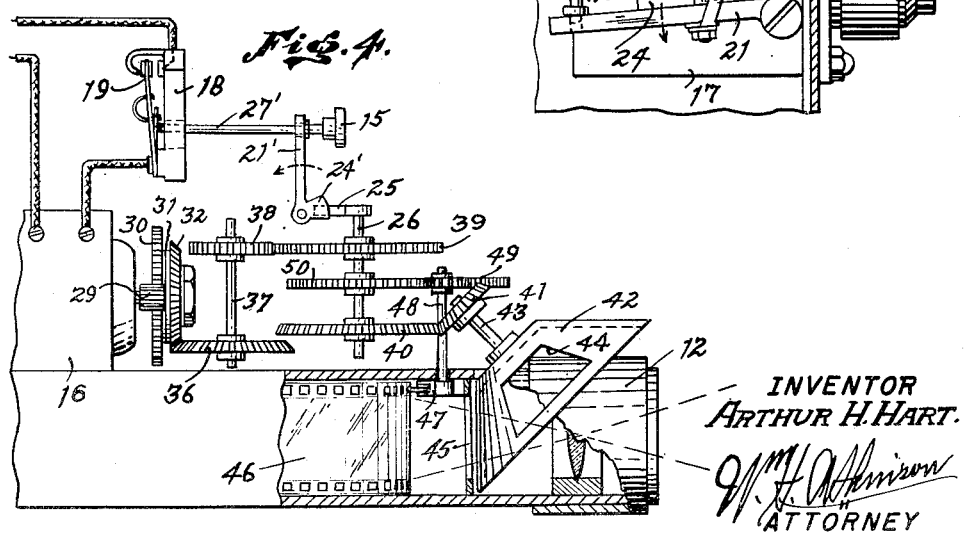
INVENTOR
ARTHUR H. HART.
ATTORNEY Patented Feb. 2, 1954

2,667,808

UNITED STATES PATENT OFFICE 2,667,808

DRIVE FOR MOVING PICTURE CAMERAS

Arthur H. Hart, San Francisco, Calif.

Application January 8, 1951, Serial No. 204,967

2 Claims. (Cl. 88—17)

The present invention relates to cameras, and more particularly to an improvement for movie cameras of the hand carried portable type such as now generally driven by a spring motor when in operation.

An object of the invention is to provide an electric motor drive for motion picture cameras of the eight and sixteen millimeter class in which the operation of the electric motor is synchronized with the shutter in a novel manner to prevent film spoilage upon the starting and stopping of the film advancing mechanism.

Another object of the invention is to provide a new and novel interlock between the motor control circuit and the shutter driving mechanism of the camera to insure that the shutter will assume a closed position when the electric motor is deenergized.

A further object of the invention is to provide a small and compact interlocking mechanism for use with an electric motor drive on motion picture cameras that will insure a uniform exposure of film during the motor starting and stopping and normal operating periods of use.

Another object of the invention is to provide a novel stop motion device for moving picture cameras of the type having a speed controlling mechanism driven by an electric motor which will avoid the necessity for film cutting and editing due to over-exposures between successive shots due to starting and stopping of the motor between periods of operation.

In the operation of a moving picture camera it is essential that the driving mechanism provide a substantially uniform operating speed when the film is undergoing exposure, and to this end spring operated movie cameras require a speed control mechanism which will operate to disconnect the spring motor from the driving mechanism when the spring has run down to a point where it cannot maintain the proper operating speed. A disadvantage found in the spring operated cameras is that the amount of film which can be exposed upon any one winding of the spring is limited to a definite footage, whereas with an electric motor drive of the character here proposed it is possible to operate the camera in a continuous manner to expose any desired amount of footage. This is limited only by the film accommodating capacity of the camera, which in some cases may amount to as much as four hundred feet of film. When the camera is operated with an electric motor drive, as here proposed, there is no problem of maintaining a constant speed of operation, but in starting and stopping the motor with a drive of this character it is desirable that some means be provided to insure a closure of the shutter during the periods when the electric motor is accelerating and/or losing speed at the time when the picture taking operations are respectively initiated and terminated. It is therefore a further object of the present invention to provide a new and novel interlocking mechanism between the electric motor control circuit and the camera shutter that will insure an opening of the shutter only when the electric motor is energized and operating at its normal speed.

Other objects and advantages will be in part evident to those skilled in the art and in part pointed out hereinafter in the accompanying description, taken in connection with the accompanying drawing, wherein there is shown by way of illustration and not of limitation a preferred embodiment of the invention.

In the drawing;

Figure 1 is a side elevation with a portion of the case broken away to show the invention as applied to a conventional sixteen millimeter movie camera, Figure 2 is a fragmentary view showing the essential parts of the invention as shown in Figure 1, but in another position, Figure 3 is a fragmentary sectional view showing details of the motor drive connection, and Figure 4 is a diagrammatic view illustrating the manner in which the motor control circuit and the shutter drive is applied in the arrangement of Figure 1.

In Figure 1 of the drawing there is shown, by way of illustration, a camera of the sixteen millimeter magazine type in which the camera case here designated generally by the numeral 10 is divided longitudinally into two compartments by a vertical partition 11. The near one of these compartments, as here illustrated, accommodates the camera operating mechanism at one side of the partition 11 and at the other side of this partition there is a chamber for a magazine of film such as is now available with fifty feet of film. Aligned with the magazine chamber there is a light aperture over which a lens mount 12 is secured. Immediately inside the camera case 10 and in front of the magazine there is a rotating shutter that operates in synchronism with the film advancing mechanism which is also located within the camera case at this point. The camera case 10 also carries the usual view finder 13 hingedly mounted in line with the lens mount 12, and at the rear end of the camera case there is a second hinged member 14 with a sight opening which serves in conjunction with the view finder 13 to direct the camera upon the object to be photographed. At one side of the housing 10 and extending through its top there is an operating button 15 by which the operation of the camera is controlled.

As here shown the vertically extending partition 11 serves as a support for an electric motor 16, and in conjunction with a spaced plate 16 this partition 11 also serves as a mounting for the various gears and other moving parts which go to make up the film speed controlling and driving mechanism as well understood in the art. Mounted upon the outside of the plate 17 there is a micro-switch 18 of conventional type having a spring contact 19 that is sensitive to the slightest or micro-movement of an operating member. In this showing the switch 18 is operated by a plunger 20 that extends upwardly from a pivotally mounted lever 21 and into engagement with an operating spring of the micro-switch 18. The lever 21 is biased upwardly or in a clockwise direction by means of a tension spring 22, and is held in an operative position by a fixed stop 23 that engages with a cam block 24 secured upon the lever 21. This cam block 24 in turn operates in conjunction with a dog or latch member 25 carried by a shaft 26, which, as will hereinafter appear, is in direct driving connection with the camera shutter. Extending downwardly from the operating button 15 and in operating engagement with the end of the pivotally mounted lever 21 there is a push rod 27.

With the above arrangement it will be seen, as shown in Figure 2 of the drawing, that when the button 15 is pressed down the push rod 27 will move the pivotally mounted lever 21 in a counter-clockwise direction so as to displace the blocking member 24 and thus release the dog 25 carried by the shaft 26. At the same time or substantially simultaneously, but preferably slightly prior to a release of the dog 25, in point of time, the micro-switch 18 will operate to connect the electric motor 16 to its source of electric power, which may be a portable storage battery. In order to establish a condition under which the electric motor 16 may accelerate up to its normal speed by the time the camera shutter opens, there is a novel slipping clutch arrangement 28 that will permit the motor 16 to operate at its normal speed even when the film driving mechanism is blocked by the blocking member 24, as above indicated.

While the slipping clutch connection referred to above may take various forms, it is here illustrated in Figure 3 of the drawing as a simple friction plate clutch of a type which has been found practical and effective for use in the manner here shown. By referring back to Figure 1 of the drawing it will be noted that the motor 16 has a driving pinion 29 which is mounted directly upon the motor shaft. This pinion may, however, be rotated at a reduced speed by a self-contained speed reducing gearing such as is often provided as an integral part of small fractional horsepower electric motor assemblies. Under some conditions of operation it is conceivable that the motor 16 may also be provided with an electrical speed controlling system by which the operating speed of the electric motor 16 and consequently the speed of the pinion 29 may be varied. At the present time these cameras are generally provided with a mechanical, frame speed controlling mechanism by which the speed of the film exposures may be controlled to provide for the exposures at eight, sixteen or sixty-four frames per second. The camera here illustrated is of this latter type. The pinion 29 is here shown as in mesh with a flat disc-like gear 30 that is held in frictional engagement with a friction clutch disc 31 which in turn engages with a friction surface formed upon the side of a beveled gear 32. The beveled gear 32 is rotatably mounted upon a stub shaft 33 that extends from a boss 34 carried by the housing of the motor 16. Interposed between the extending boss 34 of the motor housing there is a crimped spring washer 35 that is adapted to exert a uniform pressure upon the gear 30 and thus establish a friction driving contact between the gear 30, the friction disc 31 and the beveled gear 32. When assembled in this manner it will be seen that whenever the film advancing mechanism is blocked by the blocking member 24 and the dog or pawl 25 carried by the shaft 26 of the shutter driving mechanism the clutch thus formed will slip and the gear 30 will continue to rotate independently of the bevel gear 32.

As schematically illustrated in Figure 4 of the drawing the beveled gear 32 is shown as in mesh with a cooperating beveled gear 36 that is carried by a shaft 37 of the film advancing mechanism. The shaft 37 also carries an additional gear 38 that meshes with a gear 39. A gear 40 which operates through a gear 41 to rotate a shutter 42 is also secured upon the shaft 26. The shutter 42 is of the conical type and is disposed at an angle upon a shaft 43. Shutters of this type may have either one or two exposure apertures 44 positioned thereupon so as to register with a film framing aperture 45 immediately behind the lens mount 12 when the film, here designated by the number 46, is stationary. Film 46 is adapted and arranged to be advanced in a step by step manner by a film engaging finger mechanism 47 that operates in a manner as is well understood in the art. The film advancing mechanism 47 is here shown as operated by a shaft 48 that carries a gear 49 which meshes with a similar gear 50 upon the shaft 26 which, as previously described, carries the shutter stopping dog 25. In this particular illustration the dog 25 is shown as engaged by a blocking arm 24' which is the equivalent of the blocking member 24 shown in Figures 1 and 2 of the drawing. This blocking member 24' is controlled in its movements by a lever arm 21' which would be the equivalent of the pivotally mounted lever 21 in Figures 1 and 2 of the drawing. The push rod 27' as here shown operates directly upon the spring contact member 19 of the micro-switch 18. With this arrangement it will be seen that when the push rod 27' is moved to the left by pressure upon the button 15 the micro-switch 18 will be operated into its closed position. At the same time the blocking arm 24' carried by the lever 21' will be rotated counterclockwise and out of blocking engagement with the dog 25 and thus permit the shutter 42 to rotate.

During the interval between the actual energization of the motor 16 and the operation of the shutter 42 into a film exposing position the slipping clutch arrangement, provided as shown in Figure 3 of the drawing, will permit the motor to accelerate up to its normal speed, and conversely when the push rod 27' is moved to the right by release of pressure upon the button 15 the blocking member 24' of the lever 21' will be engaged by the dog 25 and thus stop the shutter 42 in its closed position immediately upon an opening of the motor control circuit. The motor will then coast to a full stop while the friction driving connection between the motor and the film advancing mechanism absorbs this power. At the same time damage to or undue strains upon the operating mechanism of the camera, due to this sudden blocking of the shutter will be avoided.

In order to simplify the present disclosure the camera here illustrated is described without reference to any film speed controlling governor mechanism such as is commonly provided in cameras of the spring operated type, nor is there any reference made to any gear changing mechanism by which different film framing speeds are obtained. When these devices are provided in the camera it will be understood that the slipping clutch and the interlocked motor control switch and shutter blocking arrangement will continue to operate in the manner above described. Where a film speed controlling governor is provided the motor 16 will be preferably operated at a speed slightly in excess of that required for the film, and under these conditions the slipping clutch arrangement will absorb any excess in the speed of the motor. In other words, when operating with a camera having a speed controlling governor the slipping clutch arrangement here disclosed will allow the motor to operate at its normal or rated speed while the differential in the speeds of the motor and the film is taken care of by slipping of the clutch arrangement. At the same time when the motor controlling switch 18 is opened the shutter 42 will be instantly stopped in its closed position while the motor 16 may continue to turn until its armature has come to rest. In the past where cameras have been provided with electric motors the stopping and starting of the picture taking operations have been controlled simply by connecting and disconnecting the motor from its source of power. With this type of control it will be understood that the motor will require a slight period of time to come up to its normal operating speed and at the same time when the motor is disconnected from its circuit there will be a period during which the motor will continue to rotate until its inertia has been completely dissipated. Therefore, with such a type of control and without the slipping clutch arrangement and shutter blocking device here disclosed, the film will be subject to over-exposure in varying degrees for several frames along the film at the points between successive shots. These over-exposed portions in the film are objectionable for projection purposes and must therefore be cut out when the film is edited in order to obtain a continuous and uniformly exposed length of film. These editing operations, which are expensive and time-consuming, are completely avoided in accordance with this invention, as the camera shutter will be blocked in a closed position at all times when the film advancing mechanism is not operating at its normal speed.

While it is conceivable that a motor circuit controlling switch 18 of a different design may be used in the carrying out of the present invention, it has been found that by employing a micro-switch of the type here illustrated it is possible to obtain a quick and positive circuit closing and opening operation which can be closely related, in point of time, with the actual operation of the shutter blocking mechanism. To this end the movements of the lever 21 which carries the blocking member 24 and the operation of the spring contact 19 of the micro-switch 18 are so adjusted that the motor circuit will be closed slightly in advance of the release of the shutter blocking mechanism when the camera is started, and upon a stopping of the picture taking operations the spring contact 19 of the micro-switch 18 will operate to open the circuit substantially simultaneously with or preferably, in point of time, slightly behind the actual engagement between the shutter holding dog 25 and the blocking member 24. This will insure that the shutter will be stopped and held in its closed position when the motor control circuit is open. At the same time the slipping clutch will take care of any over-running of the electric motor 16 during the time when the shutter is blocked against movement. With the operation of the switch 18 and the blocking of the shutter 42 timed in this manner the slipping clutch connection will be adjusted to permit a free operation of the electric motor up to its full normal speed when the film advancing mechanism is held against operation, and as a result damage to the film advancing mechanism is avoided when the shutter is stopped and held in the manner here proposed.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In an interlocking control for electric motor driven motion picture camera, the combination of a film advancing and shutter driving mechanism, an electric motor for driving said film advancing and shutter driving mechanism, a stop motion mechanism for preventing the operation of said film advancing mechanism only when said shutter is in its closed position, a slipping clutch in the driving connection between said motor and said film advancing mechanism, and a manually depressible means for rendering said stop motion means inoperative, and means associated with said stop motion mechanism adapted and arranged to effect a closing of said motor controlling switch in point of time slightly prior to a release of said film advancing mechanism by said stop motion mechanism and effect an opening of said motor controlling switch when said stop motion mechanism is operative, whereby said shutter will be stopped in its camera closing position and said film advancing and shutter driving mechanism will be operative only when in starting and stopping said motor has attained or retains its normal operating speed.

2. In an interlocking shutter control for a motor driven motion picture camera, the combination of a constant speed electric motor, a normally open quick-acting circuit controlling switch for said electric motor circuit, a stop motion dog associated with the film advancing and shutter driving mechanism of the camera, a latch bar disposed to engage said stop motion dog and prevent operation of said film advancing and shutter driving mechanism when said motor is energized, manual means for rendering said latch bar inoperative to prevent operation of said film advancing and shutter driving mechanism, a mechanical connection between said latch bar and said circuit closing switch adapted and arranged to close said switch as said latch bar is being moved into its inoperative position with respect to said stop motion dog, the operation of said latch bar and the operating character of said quick-acting circuit closing switch being such that said electric motor will be energized in point of time slightly before a release of said stop motion dog by said latch bar and be de-energized in point of time slightly following a stopping of the film and shutter driving mechanism by said stop motion dog and latch bar, and a power absorbing connection between said electric motor and film mechanism absorbing the energy of said electric motor during the initial and final operating period of said manual means.

ARTHUR H. HART.

References Cited in the file of this patent

UNITED STATES PATENTS

| Number | Name | Date |
|---|---|---|
| 1,825,253 | Victor | Sept. 29, 1931 |
| 1,912,749 | Wittel | June 6, 1933 |
| 2,083,646 | Fuller | June 15, 1937 |
| 2,441,185 | Brown et al. | May 11, 1948 |
| 2,492,979 | Freer | Jan. 3, 1950 |

FOREIGN PATENTS

| Number | Country | Date |
|---|---|---|
| 619,851 | Great Britain | Mar. 16, 1949 |